United States Patent [19]

Mayer et al.

[11] 4,295,937
[45] Oct. 20, 1981

[54] RECTIFIER

[75] Inventors: Manfred Mayer, Niedernhausen; Roland Volz, Liederbach, both of Fed. Rep. of Germany

[73] Assignee: Hoechst Aktiengesellschaft, Frankfurt am Main, Fed. Rep. of Germany

[21] Appl. No.: 132,294

[22] Filed: Mar. 20, 1980

[30] Foreign Application Priority Data

Mar. 22, 1979 [DE] Fed. Rep. of Germany ....... 2911214

[51] Int. Cl.³ .............................................. B01D 3/14
[52] U.S. Cl. .................................. 202/155; 202/156; 202/159; 202/235; 202/236; 261/114 R
[58] Field of Search ............... 202/236, 158, 159, 152, 202/153, 155, 156, 233–235, 205; 261/114 R; 203/89

[56] References Cited

U.S. PATENT DOCUMENTS

| | | | |
|---|---|---|---|
| 2,290,209 | 7/1942 | Rosenthal | 202/236 |
| 2,585,202 | 2/1952 | Whitney | 202/236 |
| 2,606,146 | 8/1952 | Luten | 202/236 |

*Primary Examiner*—Frank Sever
*Attorney, Agent, or Firm*—Curtis, Morris & Safford

[57] ABSTRACT

The rectifier having inserts for evaporation and condensation is constructed on the basis of modules (19). Each module has a distributor channel (5) for the liquid. The distributor channel (5) is positioned above the upper rim of an evaporater (1) inclined in the direction of the module axis. The evaporator (1) ends above a guide element (13) for the liquid. The guide element (13) is inclined in the direction of the module wall (14) and ends above the distributor channel (5) of the next module. The module is furthermore provided with a guide element (2) for the vapor and a condenser (10). The condenser (10) has drain elements (11, 15) for the condensate.

10 Claims, 4 Drawing Figures

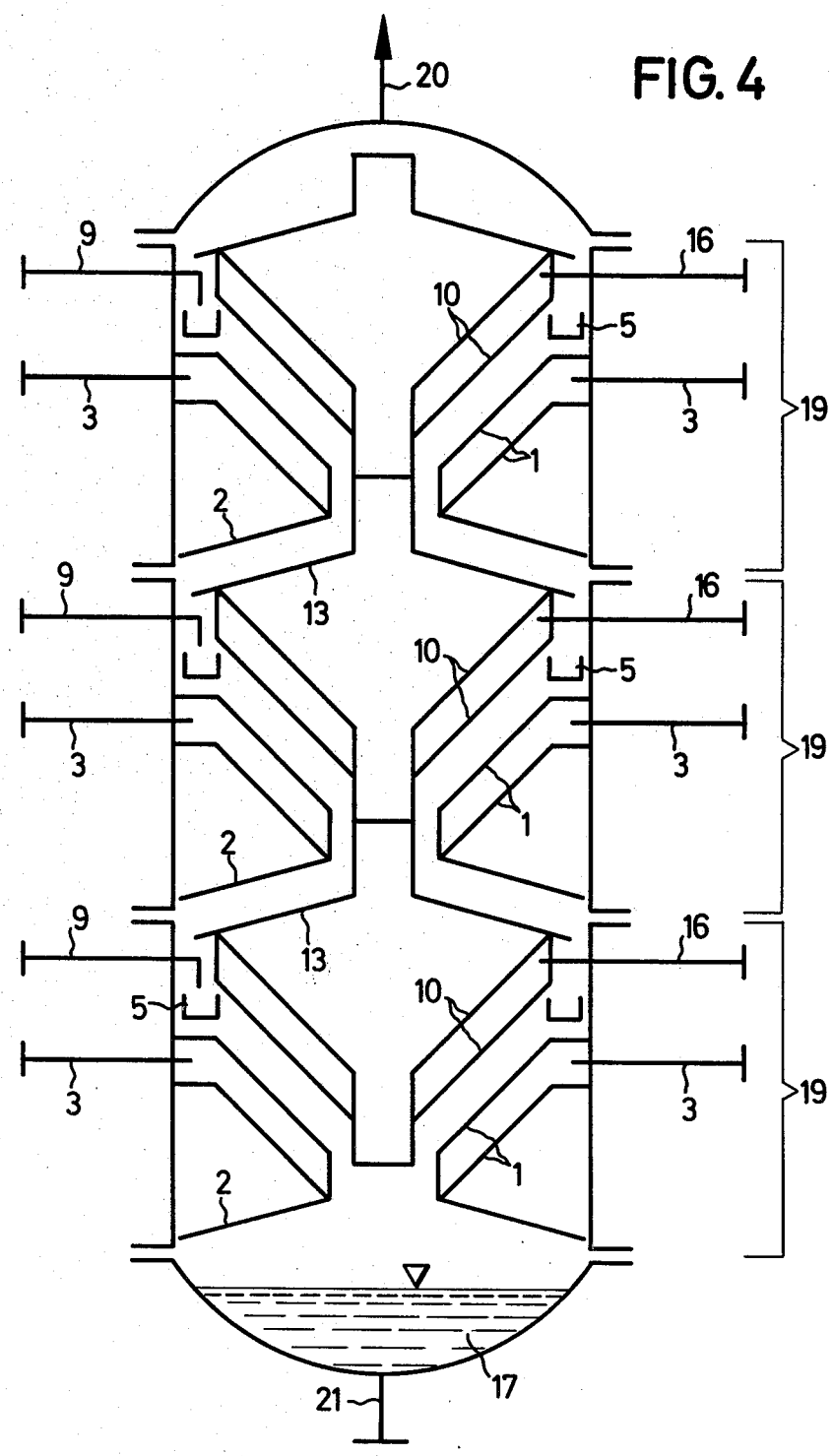

RECTIFIER

The invention provides a rectifier having installations for evaporation and condensation, wherein the loss of pressure due to separation operations is substantially reduced.

High temperature sensitive and/or high boiling substances which are to be thermally separated by rectification must be rectified in vacuo in order to ensure the necessary gentle thermal conditions. Special requirements are to be met when the rectification has to be carried out in vacuo under an absolute pressure of some millibars, that is in a medium high vacuum. Rectification is carried out in columns where the liquid collected in the condenser at the head is recycled to the column and conducted in countercurrent to the vapor produced at the bottom in an evaporator and mounting to the head, in order to ensure the required exchange of substance. By corresponding installations it is intended to attain a number of theoretical trays per meter of column height as large as possible for the obtention of a high separating efficiency. When the vapor streams through the column, it must overcome the resistance of the installations and of the liquid flowing down over their surfaces, so that a different pressure is established at the head and at the bottom of the column. This loss of pressure within the column rises considerably with increased strain, until the flood point is attained.

Column installations are known due to which the loss of pressure per number of theoretical tray can be maintained at a relatively low level. These installations consist generally of fabric packings the structure of which ensures a substantially uniform distribution of liquid and vapor. By means of distributors at different levels, the liquid must be collected and redistributed. Despite favorable arrangement and structure of the packing, even in such columns a considerable loss of pressure per number of theoretical tray occurs. In the case of lowest possible pressure at the head, this loss of pressure may cause boiling temperature at the bottom which temperature damages, that is, decomposes, substances sensitive to heat. Although a diminished throughput reduces the loss of pressure, it may result in poor distribution and low separation efficiency that is, an allover uneconomic solution of the rectification problem.

Furthermore, in the case where the mixture of substances contain a large amount of water, the distribution of liquid is insufficient due to high surface tension, and thus adversely affects the separation efficiency. Moreover, there is a considerable risk of corrosion of the fabric packings because of their extremely large surfaces.

Aother rectification device is known where a thin layer evaporator is provided with a cooled rotor, so that the vapor coming from the heater wall is condensed on the rotor, and the condensate is then hurled by the rotor to the heater wall in order to be vaporized anew. This apparatus variant of a thin layer evaporator has several disadvantages: it cannot be used but as stripping column, it has a limited number of 2 to 3 theoretical trays only, and it requires high investment cost. The decisive drawback of this design, however, resides in the vapor escape; that is, due to the very large cross-sections offered to the vapor on a short, straight way, a small amount only of the vapor is in contact with the surface of the liquid, so that part of the vapor escapes from the apparatus without being hindered and thus does not condense on the rotor.

It is therefore the object of this invention to provide a rectifier with a large number of theoretical trays which substantially prevents pressure losses between bottom and head.

In accordance with the invention, this object is achieved by a rectifier containing installations for evaporation and condensation, which is constructed on the basis of individual modules, each module comprising (a) a distributor channel for the liquid positioned above the upper rim of an evaporator inclined in the direction of the module axis, the evaporator ending above a guide element for the liquid which is inclined in the direction of the module wall until arriving above the distributor channel; (b) a guide element for the vapor and a condenser with drain element for the condensate.

According to one embodiment of the invention, the distributor channel is provided with a slotted or serrated overflow device. The evaporator is positioned concentrically in the module, it is inclined in the direction of the module axis, and it may be provided at its lower rim with the vapor guide element which extends to the module wall. The condenser can be positioned concentrically above the evaporator; the active surfaces of evaporator and condenser facing each other. The vapor guide element can be arranged at the lower end of the evaporator, it may be inclined in the direction of the module wall and extend thereto. The guide element for the liquid is positioned at the upper rim of the condenser in such a manner that it protrudes over this rim in the direction of the module wall, and that it ends above the distributor channel. It may likewise be inclined.

According to an alternative embodiment, the module wall is constructed as condenser. In this case, the vapor guide element is connected with the condenser optionally via a curved baffle plate. The guide element for the liquid is an integral part of this vapor guide element and provided with drain pipes ending in the distributor channel.

The distributor channel at the upper rim of the evaporator may be in an adjustable position. The inclination of the evaporator in the direction of the module axis is from 10° to 80°, preferably 30° to 60°. The module design allows to construct and assemble the rectifier in accordance with the requirements prevailing in each case.

The apparatus of the invention ensures a constant intense exchange of substance by condensation of the mounting vapor and evaporation of the descending liquid during the rectification operations, so that a small fraction only of that amount of vapor must pass through the entire apparatus which is otherwise required in conventional columns having a bottom evaporator and head condenser in order to attain the necessary separation efficiency. In conventional columns, therefore, the considerable amount of vapor necessary for a corresponding reflux required in order to ensure a sufficient rectification effect must be conducted from the bottom of the column to the condenser at the head, and this causes a big loss of pressure. In the apparatus of the invention, however, the reflux necessary for the mass transfer is distributed by condensation and reevaporation over the complete height of the installation. The liquid flows over heatable surfaces thus, part of it is evaporated. The ascending vapor is condensed on condensation surfaces, and the condensate is recycled onto the evaporator.

The invention will be better understood by reference to the accompanying drawings which illustrate some embodiments thereof serving as examples only.

FIG. 4 is a schematic view of an example of the rectifier according to the invention.

Figure 1:
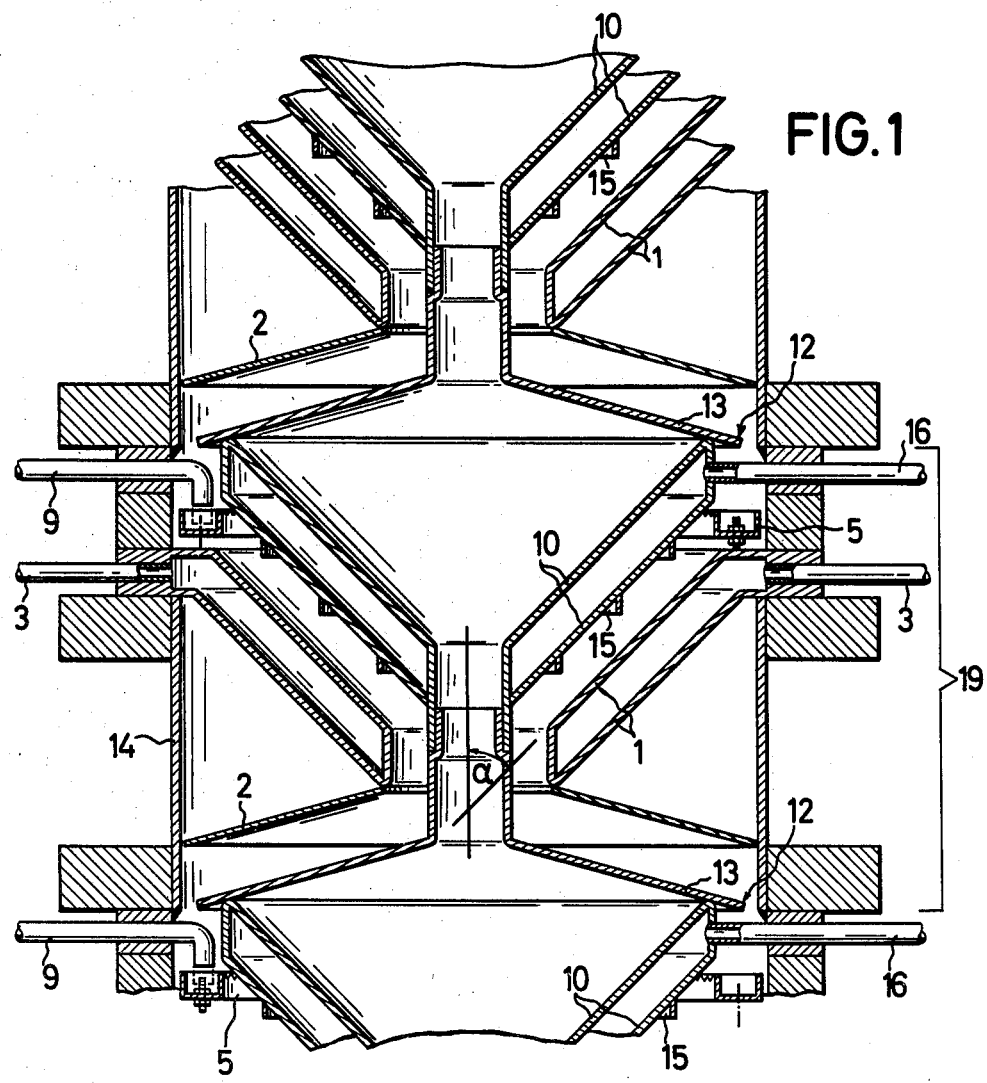
FIG. 1 shows a module of a rectifier and its operation mode in combination with adjacent modules.

The rectifier is constructed on the basis of individual modules (19) or stages. Each module (19) is provided with an evaporator (1), a condenser (10), a distributor channel (5), a guide element (2) for the vapor, a guide element (13) for the liquid, and a drain element (11). The evaporator (1) is concentrically arranged in the module and provided with feed ducts (3) for heating means. The evaporator (1) is inclined towards the axis of the module at an angle $\alpha$ which is in the range of from 10° to 80° C., preferably 30° to 60°. Thus, the evaporator (1) forms sort of a funnel for the liquid which is fed to the evaporator via the distributor channel (5) suitably in the form of a film. The distributor channel (5) is a ring channel fixed at the upper rim of the evaporator by means of an adjusting device, for example threaded bolts (6) with adjusting nuts (7). That rim of the distributor channel (5) which faces the evaporator (1) is designed as overflow device (8), and preferably serrated or slotted. The distributor channel (5) is provided with a duct (9) for the feed or removal of liquid. The liquid running down from the evaporator (1) hits the guide element (13) and is then conducted optionally via drain pipe (4) (FIG. 2) to the distributor channel (5) of the next module (19). The guide element (13) may be fixed to the condenser (10). In the case of a conical surface such as illustrated in FIG. 1, its rim is provided with a drain edge (12). The condenser (10) is positioned above, and parallel or substantially parallel to the evaporator (1), and the distance to the heated surface is from 20 to 50 mm. Thus, the vapor ascending from the evaporator is directly condensed after having passed a short distance only. The condensate formed returns in the form of drops to the evaporator positioned below. In order to prevent the condensate from running off from the inclined condenser surfaces, dropping devices (15) are positioned in intervals of about 50 mm. The vapor ascending from the lower module and led by guide element (2) which is arranged at the lower rim of evaporator (1) and extends to the module wall (14) enters the space formed between condenser (10) and evaporator (1), and can be condensed partially on the condenser. The duct (16) serves for feeding or letting off cooling means.

In an alternative design, the wall (14) of the module is constructed as condenser (10), provided at its lower end with a drain element (11) for the condensate ending in the distributor channel (5) of the next module. Guide element (2) for the vapor may be provided with a curved baffle plate (18) via which it is connected with condenser (10).

FIG. 4 shows a rectifier comprising for example 3 modules (19). The vapor is removed via ducts (20) and optionally conducted to a condensation step (not shown). An evacuation device is not shown, either. The liquid may be removed via duct (21). At the bottom (17), a boiler (not shown) may be present. For each module (19), from 1 to 3 theoretical trays are feasible, the loss of pressure being from 0.03 to 0.07 mbar per theoretical tray at a system pressure of about 2 mbars. The throughput is comparable to that causing a loss of pressure of 0.7 mbar per theoretical tray in a column provided with a fabric packing.

Figure 2:
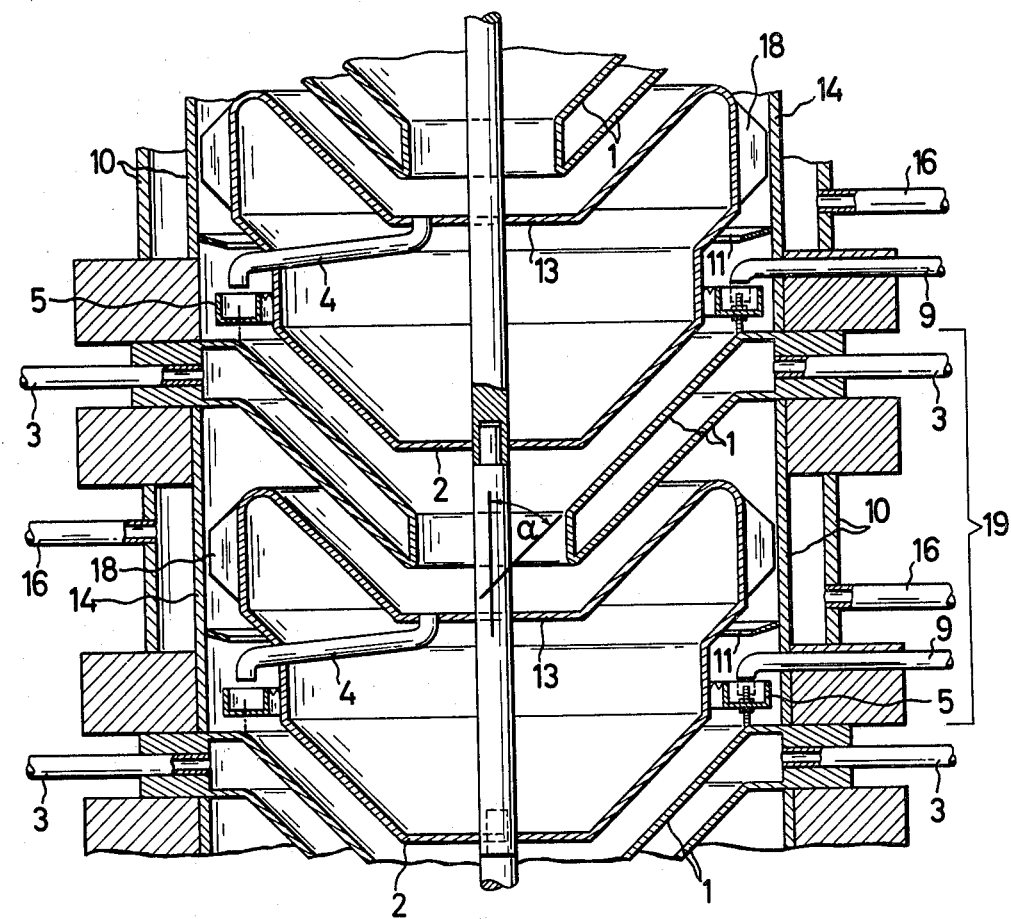
FIG. 2 illustrates an alternative design of the module of FIG. 1.
Figure 3:
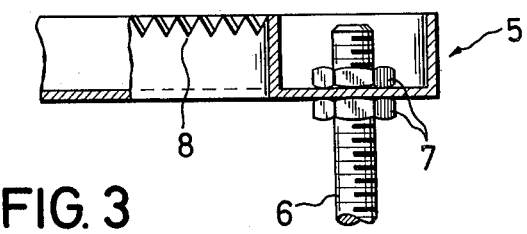
FIG. 3 shows a detail of the distributor channel.

The apparatus according to FIG. 2 is well suited for separating operations involving a high liquid charge or large amounts of vapor and in which a relatively small number of theoretical trays are required; while the apparatus according to FIG. 1 is well suited for separting operations requiring a great number of theoretical trays at only a small amount of head vapor. The advantages of considerably reduced loss of pressure when using the apparatus in accordance with the invention are increased by the fact that separate feed to and product removal (via a second outlet) from each module is possible without substantial expenditure, for example installation of expensive collectors and distributors of liquid. The apparatus of the invention can be adapted to any special operational requirement by chosing a corresponding number of modules which are identical and thus can be economically manufactured in standard series.

In the case of batchwise rectification, the feed can be switched to other modules in a simple manner, depending on the decreased amount of low-boiling substance, so that the apparatus can be adapted any time to the corresponding state of concentration at the bottom, and optimally utilized.

What is claimed is:

1. A rectifier for separating a refineable substance by evaporation to a vapor and condensation to a liquid, the rectifier being comprised of a plurality of individual modules arranged atop one another, each such module comprising:

a peripheral module wall;

evaporator means for vaporizing said substance and having a surface inclined downward in the direction of the axis of the module, an upper rim, a lower rim, and a liquid guide element for said liquid at the lower rim thereof inclined downward toward said module wall;

a distributor channel disposed above the upper rim of the evaporator means for distributing the liquid thereto, the distributor channel being positioned to receive the liquid from the guide element of the module just above;

condenser means for condensing said vapor to a liquid, having at least one drain element thereon for channelling the condensed liquid; and a vapor guide element for guiding to the condenser means vapor from the module just below.

2. A rectifier as claimed in claim 1, wherein said distributor channel is affixed above the upper rim of the evaporator means, is arranged concentrically in the module, is inclined downward in the direction of the module axis, and includes overflow means permitting the liquid therein to spill over toward said evaporator means;

said evaporator means has a lower rim with said vapor guide element extending from said lower rim toward said module wall; said condenser means carries at the upper rim thereof the liquid guide element of the module just above, such liquid guide element extending above the distributor channel, and includes a surface facing said evaporator means, said drain element being provided on said surface.

3. A rectifier as claimed in claim 1, wherein said distributor channel includes a ring channel which is affixed above the upper rim of the evaporator means and is arranged concentrically in the module and inclined in the direction of the module axis, and includes overflow means permitting the liquid therein to spill over toward said evaporator means;

said liquid guide element includes a drain pipe extending from the lower rim of the evaporator means to the distributor channel of the module just below;

said condenser means is co-located with said module wall, and said drain element is provided extending concentrically therefrom to a point above the distributor channel in the module just below; and said vapor guide element has one surface thereof above and parallel to the surface of the evaporator means, another surface parallel to said condenser means, and yet another surface below and parallel to the surface of the evaporator means.

4. A rectifier as claimed in any one of claims 1–3, wherein each said module includes means for adjusting the position of said distributor channel above the upper rim of the evaporator means.

5. A rectifier as claimed in any of claims 1–3, wherein the surface of the evaporator means is inclined toward the module axis at an angle of 10 to 80 degrees.

6. A rectifier as claimed in claim 5, wherein said surface is inclined at an angle of 30 to 60 degrees.

7. A rectifier as claimed in either of claim 2 or 3, wherein said overflow means of said distributor channel includes a serrated overflow weir.

8. A rectifier as claimed in claim 3, wherein said vapor guide element includes a curved baffle plate provided at an axial position in the module corresponding to that of the condenser means.

9. A rectifier as claimed in claim 8, wherein said vapor guide element is coupled with the condenser means by means of said curved baffle plate.

10. A rectifier as claimed in claim 1, wherein said distributor channel includes a serrated overflow weir.

* * * * *